US009478951B2

(12) United States Patent
Faber et al.

(10) Patent No.: US 9,478,951 B2
(45) Date of Patent: Oct. 25, 2016

(54) METHOD FOR TREATING INTERNAL ARCS (71) Applicant: SCHNEIDER ELECTRIC USA, INC., Palatine, IL (US)

(72) Inventors: Timothy Faber, Marion, IA (US); Cameron Woodson, Cedar Rapids, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/585,518

(22) Filed: Dec. 30, 2014

(65) Prior Publication Data
US 2016/0190777 A1 Jun. 30, 2016

(51) Int. Cl.
*H02B 1/30* (2006.01)
*H02B 1/56* (2006.01)

(52) U.S. Cl.
CPC .............. *H02B 1/565* (2013.01); *H02B 1/30* (2013.01)

(58) Field of Classification Search
CPC .......... H02B 7/01; H02B 1/12; H02B 13/01; H02B 13/025; H02B 13/065; H02B 5/00; H02B 11/00; H05K 7/20; H01H 9/342; H01H 31/12; H01H 33/53; A47B 81/00; A47B 97/00
USPC ....... 361/601, 605, 608, 614, 640–648, 652, 361/656, 676, 678, 679.46, 602, 611, 618, 361/622, 624, 627, 690; 165/121–126; 454/184, 185, 186; 200/400, 289, 50.3, 200/50.17, 50.21, 50.23, 50.32, 306–308; 174/50, 520, 17 VA; 218/155, 156, 218/157, 158
See application file for complete search history.

(56) References Cited

U.S. PATENT DOCUMENTS

| | | | |
|---|---|---|---|
| 6,762,389 B1 * | 7/2004 | Crooks | H01H 9/342 218/157 |
| 6,960,736 B1 * | 11/2005 | Bach | H01H 9/342 200/306 |
| 6,977,354 B1 | 12/2005 | Shea et al. | |
| 7,140,702 B2 * | 11/2006 | Byron | H01H 31/12 312/223.1 |

(Continued)

FOREIGN PATENT DOCUMENTS

| | | | | |
|---|---|---|---|---|
| DE | 3424363 A1 * | 1/1986 | | H02B 1/12 |
| DE | 19520698 A1 * | 11/1986 | | H02B 13/025 |

(Continued)

OTHER PUBLICATIONS

Extended EP Search Report for EP Application No. EP15203176 dated Apr. 29, 2016.

*Primary Examiner* — Michail V Datskovskiy
(74) *Attorney, Agent, or Firm* — Locke Lord LLP (57) ABSTRACT

Methods and systems for controlling and limiting the damage caused by arcs in electrical distribution equipment provide a cooling assembly that uses a filter or other porous substrate to absorb the energy from the arc byproducts. The filter-based cooling assembly may be used with a passive arc management device having a chamber sized and shaped to control and/or extinguish arcs and ventilation ports for expelling the arc byproducts into the cooling filter assembly. The filter-based cooling assembly may be installed in line with, at the end of, or as a substitute for, any ventilation conduits or tubes in the arc management device, or in the backplane of the arc management device, or the like, to absorb energy from the arc byproducts, cool them to a safe temperature, and vent them inside the equipment cabinet.

15 Claims, 12 Drawing Sheets

(56) References Cited

U.S. PATENT DOCUMENTS

| | | |
|---|---|---|
| 7,176,771 B2 | 2/2007 | Faber et al. |
| 7,352,551 B2 * | 4/2008 | Chevallier ............ H02B 13/025 361/118 |
| 7,952,857 B1 | 5/2011 | Motley et al. |
| 8,189,325 B2 * | 5/2012 | Kurogi .................. H02B 13/01 218/157 |
| 8,922,977 B2 | 12/2014 | Faber |
| 9,057,742 B2 * | 6/2015 | Furlano ................. G01R 19/00 |
| 9,064,648 B2 * | 6/2015 | Rival ..................... H01H 9/342 |
| 9,117,607 B2 * | 8/2015 | Page, II ................ H01H 33/53 |
| 2003/0048586 A1 * | 3/2003 | Faber ..................... H01H 9/342 361/1 |
| 2005/0174721 A1 * | 8/2005 | Chevallier ........... H02B 13/065 361/600 |
| 2013/0279083 A1 | 10/2013 | Faber |
| 2015/0015997 A1 | 1/2015 | Faber |

FOREIGN PATENT DOCUMENTS

| | | | |
|---|---|---|---|
| DE | 3525143 A1 * | 1/1987 | ............... H02B 1/12 |
| EP | 007708 | 12/1984 | |
| EP | 2525456 | 11/2012 | |
| WO | 2015009291 | 1/2015 | |

\* cited by examiner

METHOD FOR TREATING INTERNAL ARCS

CROSS-REFERENCE TO RELATED APPLICATIONS

The present application is related in subject matter to commonly-assigned U.S. application Ser. No. 13/452,145, entitled "Passive Arc Management System with a Flue Chamber," filed 20 Apr. 2012; International Application No. PCT/US13/50797, entitled "Internal Arc Management and Ventilation for Electrical Equipment," filed 17 Jul. 2013; U.S. application Ser. No. 14/501,946, entitled "Passive Arc Protection for Main Breaker Line Side Power Conductors," filed Sep. 30, 2014; U.S. application Ser. No. 14/585,477, entitled "Bus End Interrupter," filed concurrently herewith; and U.S. application Ser. No. 14/585,703, entitled "Panelboard Power Bus with Arc Transfer for Passive Arc Control," filed concurrently herewith, all of which are incorporated herein by reference in their entirety.

FIELD OF THE INVENTION

The present invention relates generally to methods and systems for controlling and limiting the damage caused by arcing in electrical distribution equipment and, more particularly, to a method and system for cooling the byproducts resulting from such arcing.

BACKGROUND OF THE INVENTION

Arcing or arc fault is an electrical discharge through a normally non-conductive gas, usually air. Such arcing can occur internally in low-voltage electrical distribution equipment between exposed conductors of different electrical potentials, such as adjacent busbars or a busbar and ground. When an arc jumps from one conductor to another across an air gap, it can stretch and bend to follow the path of least resistance across the air gap.

The hazards of unexpected and/or uncontrolled internal arcing are well known and include potential damage to equipment and harm to personnel in the operating environment caused by arc flash and arc blast, hereinafter referred to for simplicity as arc blast. Arc blasts in typical electrical distribution equipment can release large amounts of energy that can produce intense pressures, extremely hot gasses, vaporized metals/polymers, and other harmful byproducts.

Techniques for controlling arcing are known in the art, including passive and active arc control techniques. Active arc control techniques usually include some form of sensing and a switching mechanism to control the arc current. Concerns with active techniques may include higher cost, nuisance breaker trips, speed, and undetected system failures. Passive techniques may include containment and directed venting of the arc energy and gasses. Other passive arc control techniques may include structural reinforcements to better withstand the byproducts from the arc. Neither of the above passive methods limits the duration of the arcing event.

In addition, some passive internal arc management devices, such arc resistant switchgear and the like, use ventilation conduits and/or tubes to vent the arc byproducts. However, the hot gasses, vaporized metals/polymers, and other byproducts remain sufficiently hot even after leaving the tubes or conduits to remain conductive, potentially damaging other components. Additional costs in components and assembly labor must be expended to address these concerns.

Thus, a need exists for an improved way to control and limit the damage caused by arcs in electrical distribution equipment and particularly the damage caused by extremely hot byproducts resulting from such arcs.

SUMMARY OF THE DISCLOSED EMBODIMENTS

The embodiments disclosed herein are directed to methods and systems for controlling and limiting the damage caused by arcs in electrical distribution equipment. The methods and systems provide a cooling assembly that uses a filter or other porous substrate to absorb the energy from the extremely hot gasses, vaporized metals/polymers, and other harmful byproducts resulting from an arc. The filter-based cooling assembly may be mounted on, installed in, and otherwise used with any passive arc management device having an arc chamber sized and shaped to control and extinguish arcs and having ventilation ports for expelling the arc byproducts. These arc management devices may include, for example, ArcBlok™ technology from Schneider Electric USA, Inc., and similar technology as described in greater detail in the related applications cited above. The arc management devices can expel or evacuate the filtered and cooled arc byproducts into a ventilation area within the enclosure, such as a surrounding cabinet, of the distribution equipment. The filter-based cooling assembly may be mounted in place of "closed system" ventilation tubes used with the arc management devices, whether located in the backplane of the arc management device, at a bus end ventilation port of the arc management device, or the like. The arc byproducts may be filtered by the filter-based cooling assembly to cool them to a temperature where they are no longer conductive and can no longer reignite (e.g., 2,000° F.) after they are released from the arc management device.

In some implementations, the filter-based cooling assembly may employ a honeycomb type filter having a sufficiently high surface-area-to-cross-section ratio to quickly cool the arc byproducts to a temperature where they are no longer conductive and can no longer reignite. The honeycomb type filter may be a stainless steel honeycomb filter or an aramid fiber honeycomb filter, such as those available from Plascore, Inc. of Zeeland, Mich. Two or more of the honeycomb type filters may then be stacked on top of one another in an overlapping or staggered manner to increase the number of channels through which the arc byproducts must pass within each filter. This overlapping or staggering has the effect of progressively increasing the rate at which energy is absorbed from the arc byproducts as they pass through the filters. A housing or enclosure may be used to house or otherwise hold the overlapping honeycomb filters in the cooling assembly. The filter-based cooling assembly may then be installed in line with, at the end of, or as a substitute for, any ventilation tubes in the arc management device to absorb energy from the arc byproducts as they are ventilated from the arc management device.

In some implementations, the filter-based cooling assembly may employ a mesh or screen type filter having a sufficiently low porosity to cool the arc byproducts to a temperature where they are no longer conductive and can no longer reignite in a very short amount of time. The screen type filter may be a multi-screen filter composed of progressively finer layers of metal screens similar to filters used as circuit breaker particulate filters from Schneider Electric USA, Inc. It has been found that such screen type filters can absorb a significant amount of energy when used for cooling purposes. As with the honeycomb type filter, the screen type filter-based cooling assembly may be installed with the arc management device to absorb energy from the arc byproducts as they are ventilated from the passive arc management device.

In general operation, when an arc occurs in arc resistant electrical distribution equipment, arc byproducts are ventilated through the filter-based cooling assembly of the arc management device. The filter-based cooling assembly quickly absorbs energy from the byproducts to reduce their temperature from approximately 5,000° F. or higher to a temperature where they are no longer conductive and can no longer reignite.

In some cases, the particular type of filter being used with the filter-based cooling assembly may overly restrict or block normal convective airflow in the electrical distribution equipment, as may be the case with the multi-screen filter. In such cases, check valves or the like may be provided in the cooling assembly to facilitate convective airflow. The check valves remain open during normal convective airflow, but immediately close off normal airflow when there is a sudden increase in pressure in the arc management device, such as may result from an arc blast.

In general, in one aspect, the disclosed embodiments are directed to an arc resistant electrical distribution equipment. The arc resistant electrical distribution equipment comprises, among other things, a passive arc management device installed on the electrical distribution equipment, a ventilation port formed in the arc management device and having a size and shape to expel arc byproducts resulting from arcs that occur in the electrical distribution equipment, and a filter housing located on the arc management device, the filter housing having a cooling filter housed therein, the cooling filter positioned to receive the arc byproducts expelled from the ventilation port. The cooling filter has a sufficiently high heat absorption capacity to cool the arc byproducts to a temperature where the arc byproducts can no longer reignite.

In general, in another aspect, the disclosed embodiments are directed to a method of limiting damage from arc blasts in electrical distribution equipment. The method comprises, among other things, receiving an arc in a chamber of an arc management device, channeling arc byproducts resulting from the arc to a ventilation port in the arc management device, filtering the arc byproducts to a temperature where the arc byproducts can no longer reignite, and releasing the filtered arc byproducts from the arc management device.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
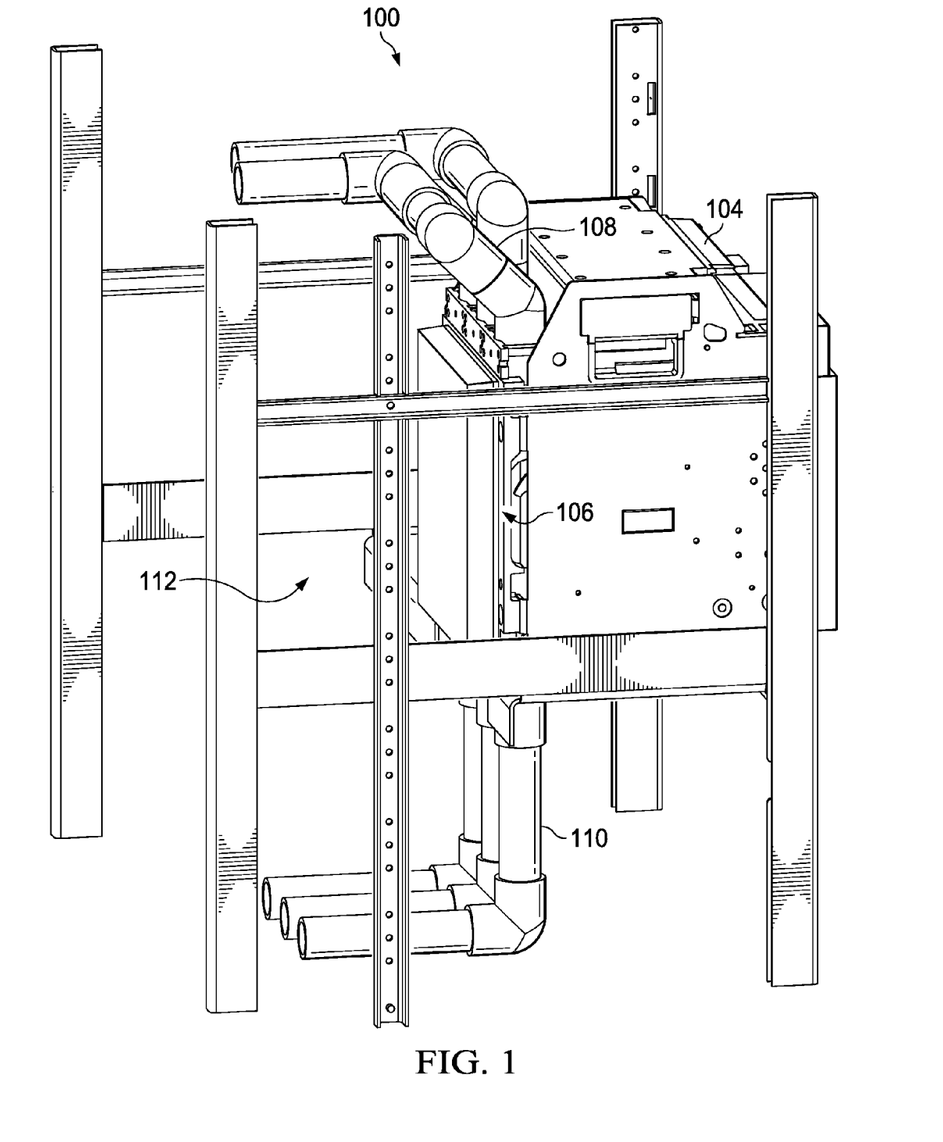
FIG. 1 shows an equipment cabinet and circuit breaker having an arc management device with a cooling assembly according to one or more embodiments disclosed herein.

Referring now to FIG. 1, a partial view of an interior of an exemplary cabinet 100 for electrical distribution equipment such as draw out circuit breakers is shown. The cabinet 100 is designed to house a plurality of draw out circuit breakers, one of which is indicated at 104. Such a cabinet 100 may be, for example, a motor control center (MCC) cabinet, a load center cabinet, switchgear cabinet, such as the Power-Zone 5® Arc Resistant Low Voltage Switchgear from Schneider Electric USA, Inc., and the like, that can provide arc flash protection.

The draw out circuit breaker 104 is specifically designed to be racked in and out of the cabinet 100 for maintenance and other purposes. It is now known for such draw out circuit breakers 104 to be equipped with a passive arc management device 106 to help control and limit damage caused by arcing. Examples of passive arc management devices that may be used with the draw out circuit breakers 104 include the ArcBlok™ family of arc management devices from Schneider Electric USA, Inc., as cited above.

For a draw out circuit breaker, the arc management device 106 can have an arc chamber formed by: the back of the breaker, the cluster surrounds extending off of the back of the breaker, and these two parts interfaced into the phase barriers extending off of the back-mold and the back-mold itself, as described in U.S. application Ser. No. 13/452,145 referenced above. The arc management device 106 is fitted with ventilation tubes or conduits 108 and 110 protruding from the top and bottom of the device, respectively, to expel or evacuate arc byproducts into cooling filters as described herein. The cooling filters may then release the arc byproducts to a ventilation area 112 of the switchgear cabinet interior.

In accordance with the disclosed embodiments, one or more arc byproduct cooling assemblies, also called cooling filters, may be mounted on, installed in, or otherwise used with the arc management device 106 and its conduits to cool the arc byproducts before they are released into the ventilation area of the cabinet interior 112. The cooling assemblies employ a filter or other porous substrate to absorb energy from the hot gasses, vaporized metals/polymers, and other harmful byproducts resulting from an arc. The filter-based cooling assemblies may then be used to cool the arc byproducts from their typical temperature (e.g., 5,000° F.) to a temperature where they are no longer conductive and can no longer reignite (e.g., 2,000° F.) after they are released into the cabinet interior 112.

Figure 2:
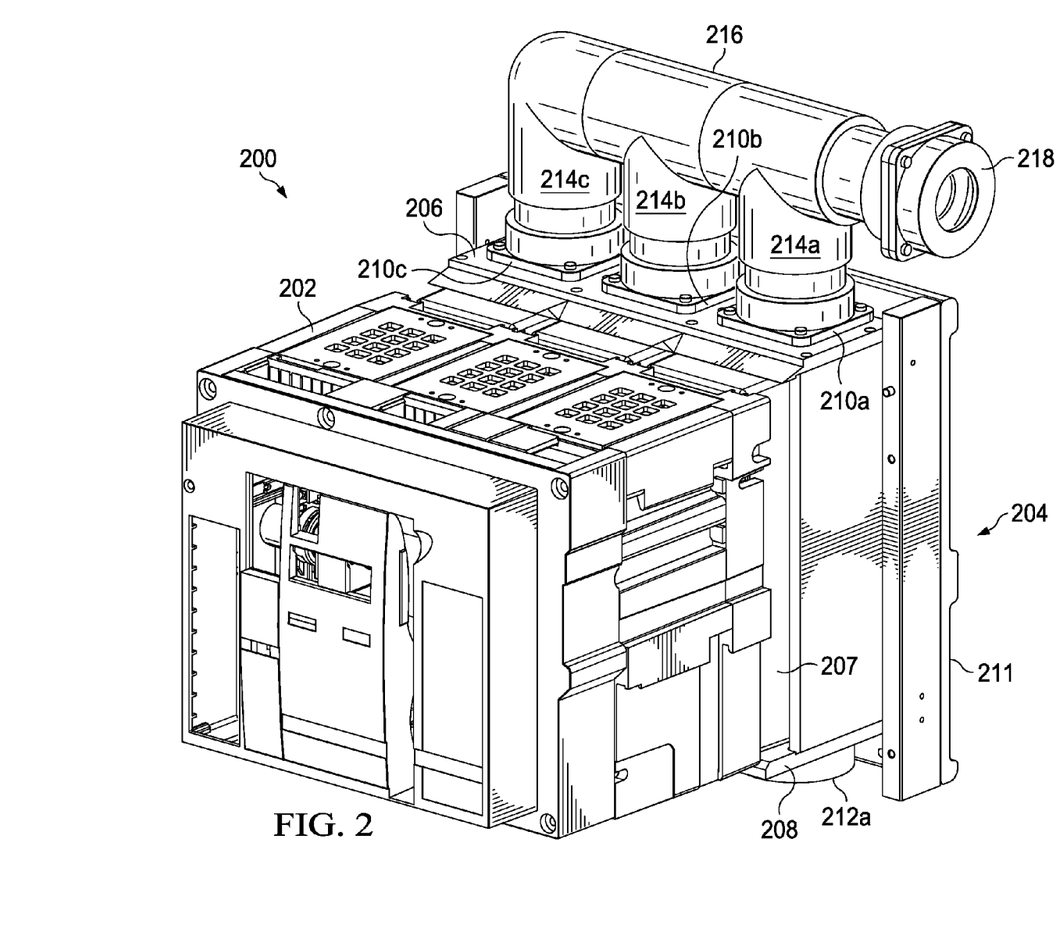
FIG. 2 is a circuit breaker and arc management device with an exemplary cooling assembly according to one or more embodiments disclosed herein.

FIG. 2 shows an example of a draw out circuit breaker 200 equipped with an arc management device having a cooling assembly as disclosed herein. The draw out circuit breaker 200, shown here without the draw out chassis, has an enclosure 202 in which individual circuit breaker poles for three-phase power may be housed (not expressly shown). The breaker 200 interfaces, as described in U.S. application Ser. No. 13/452,145, through its assembly of cluster shields 207 with phase barriers at the back-mold 211 of the bus assembly, thereby forming an arc management device 204. The arc management device 204 has a top cover 206 on which several mounting flanges 210a, 210b, and 210c are fastened, as well as a bottom cover 208 on which several check valves 212a, 212b, and 212c (only one check valve 212a is visible here) are fastened. The mounting flanges 210a-c are positioned over ventilation openings or ports (not visible here) in the top cover 206, one flange per ventilation port, while the check valves 212a-c are positioned over ventilation openings or ports in the bottom cover 208, one valve per ventilation port and one ventilation port per conductive phase. These check valves 212a-c operate by staying open to allow convective airflow over each bus conductor phase (not shown) in ordinary operation, but immediately shut in the presence of the high pressure of an arc blast and forcing arc byproducts through the ventilation openings or ports in the top cover 206.

The ventilation openings or ports in the top cover 206 lead to tubular extensions 214a, 214b, and 214c extending vertically from the mounting flanges 210a-c to a common ventilation tube or conduit 216 running perpendicularly thereto. The common ventilation tube 216, tubular extensions 214a-c, and mounting flanges 210a-c allow movement of arc byproducts from the arc management device 204 into the cabinet interior 112 (FIG. 1) and may be formed as a unitary piece or as separate components depending on the embodiment. A filter-based cooling assembly 218, as will be described further herein, may then be mounted over the end of the common ventilation tube 216 to cool the arc byproducts as they enter the cabinet interior ventilation area 112.

In general operation, when an arc occurs in one of the draw out circuit breakers 200, tremendous pressure is created within the arc management device 204. The intense pressure causes the check valves 212a-c, which are normally open to convective airflow, to immediately close. This forces arc byproducts produced by the arc to surge through the ventilation openings or ports in the top cover 206, into the common ventilation tube 216, through the filter-based cooling assembly 218, and out into the cabinet ventilation area 112. As the arc byproducts pass through the filter-based cooling assembly 218, energy is quickly absorbed from the arc byproducts to reduce their temperature from approximately 5,000° F. or higher to a lower temperature where they are no longer conductive and can no longer reignite (e.g., 2,000° F.). The cooled and nonconductive arc byproducts are then released in the cabinet interior and out of the cabinet if desired.

Note that the ventilation tube 216 and the filter-based cooling assembly 218 need not protrude from the top of the arc management device 204 and might, for example, in some embodiments swap locations with the check valves 212a-c so the ventilation tube 216 protrudes from the bottom of the arc management device 204.

Figure 3:
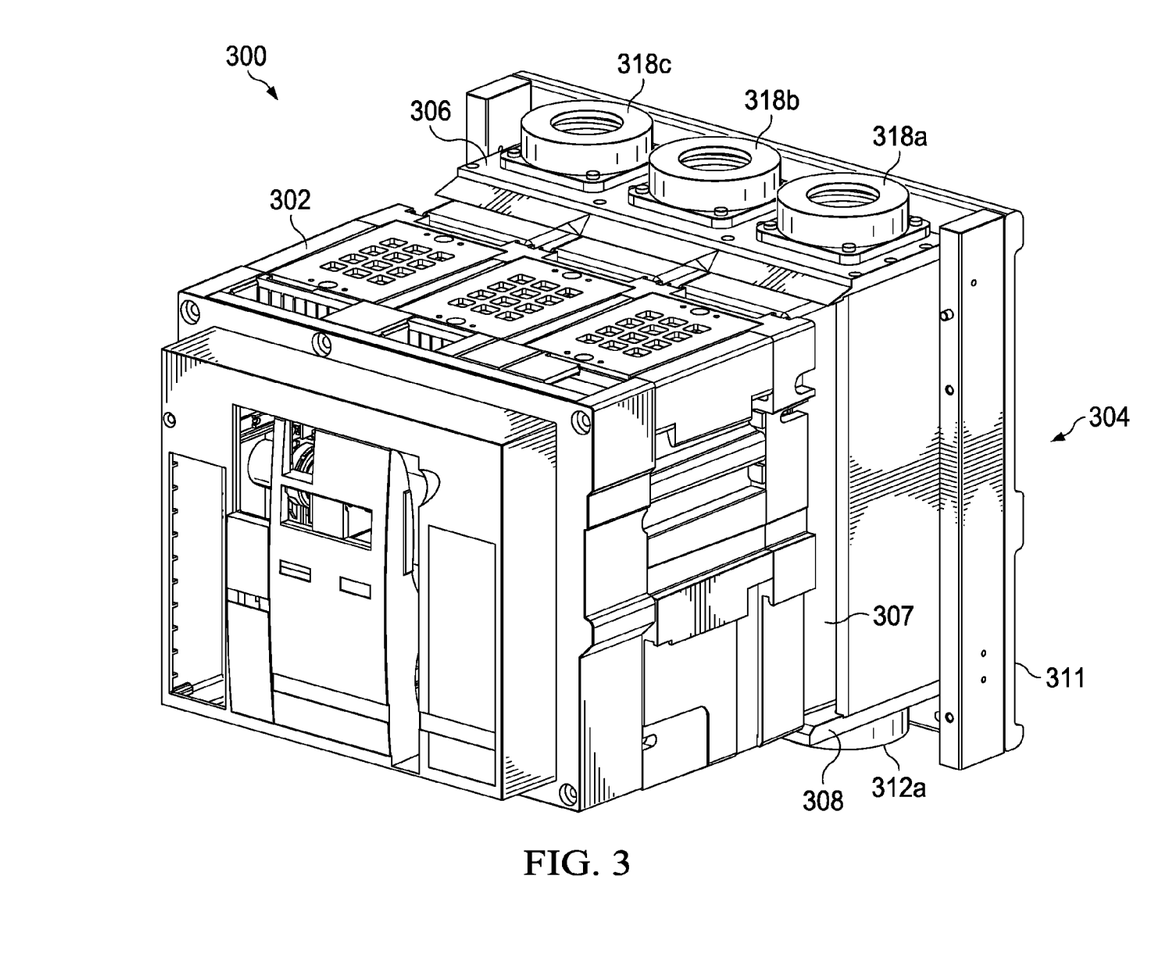
FIG. 3 is another circuit breaker and arc management device with exemplary cooling assemblies according to one or more embodiments disclosed herein.

As depicted in FIG. 3, the filter-based cooling assembly may also be deployed directly on the arc management device instead of at the end of the ventilation tube. A draw out circuit breaker 300 according to this embodiment may be similar to the draw out circuit breaker 200 in the previous embodiment and have an arc management device 304 formed at the rear thereof. As with the previous embodiment, the circuit breaker 300 interfaces through its assembly of cluster shields 307 with phase barriers at the back-mold 311 of the bus assembly to form the arc management device 304. The arc management device 304 may have a bottom cover 308 on which several check valves 312a, 312b, and 312c (only one check valve 312a is visible here) are mounted over ventilation openings or ports in the bottom cover 308, one valve per ventilation port and one ventilation port per conductive phase. However, in lieu of a ventilation tube 216, the arc management device 304 in this embodiment has several filter-based cooling assemblies 318a, 318b, and 318c mounted on the arc management device 304. These filter-based cooling assemblies 318a-c may be attached, for example, directly to the top cover 306 over the ventilation openings or ports therein. The filter-based cooling assemblies 318a-c may then be used to cool arc byproducts from the arc management device 304 before they are released into the cabinet interior (see FIG. 1).

Figure 4:
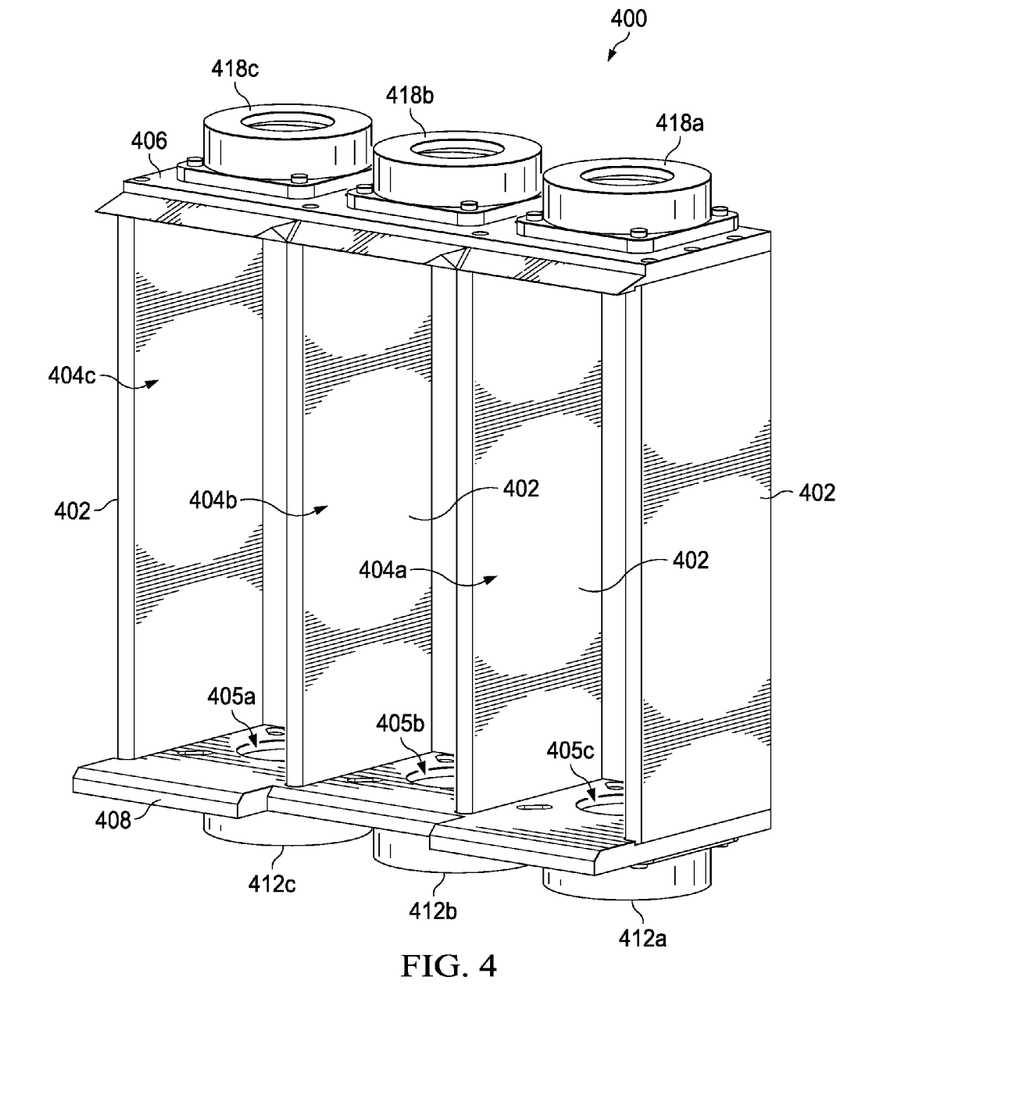
FIG. 4 is an arc management device with exemplary cooling assemblies according to one or more embodiments disclosed herein.

An internal view of a portion of an arc management device is illustrated in FIG. 4 at 400. Note only one half of the arc management device 400 is shown in FIG. 4, with the other half being attached to the back of the draw out circuit breaker. The half of the arc management device 400 shown in FIG. 4 may include nearly identical parallel and equidistant phase barriers 402. These phase barriers, sometimes referred to as phase surrounds 402, together with a top cover 406 and bottom cover 408, divide the interior of the back-mold half of the arc management device 400 into three individual arc suppression chambers 404a, 404b, and 404c that help capture and ventilate arc byproducts occurring at any one phase conductor. Filter-based cooling assemblies 418a, 418b, and 418c may then be mounted on the top cover 406 directly over the arc suppression chambers 404a-c, one cooling assembly per chamber. Similarly, check valves 412a, 412b, and 412c (or similar valves) may be mounted on the bottom cover 408 directly under the arc suppression chambers 404a-c. Ventilation ports are positioned in the top and bottom covers 406 and 408 under and over the cooling filter assemblies 418a-c and the check valves 412a-c, respectively, to enable ambient airflow through the arc suppression chambers 404a-c. Only the ventilation ports 405a, 405b, and 405c in the bottom cover 408 are visible here.

Figure 5:
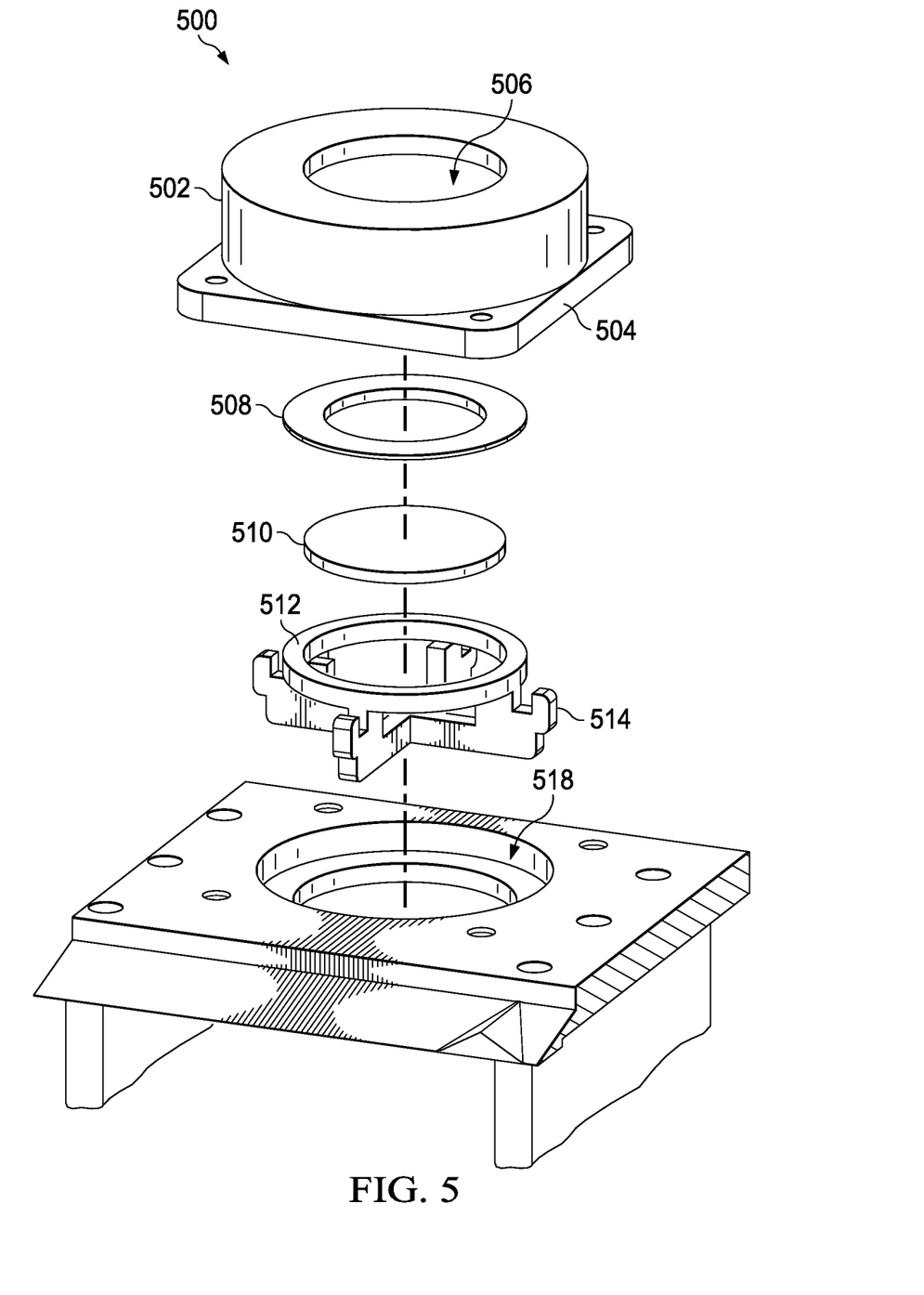
FIG. 5 is an exemplary cooling assembly according to one or more embodiments disclosed herein.

FIG. 5 shows an exemplary implementation of a filter-based cooling assembly 500 according to the embodiments disclosed herein. It is of course understood that other arrangements besides the one shown here may be used without departing from the scope of the disclosed embodiments. In FIG. 5, the cooling assembly 500 has a generally cylindrical housing 502 atop a generally rectangular mounting flange 504 and having a generally circular opening 506. The cooling assembly 500 also includes a sealing ring 508, a cooling filter 510 or other porous substrate, a support ring 512, and a cradle 514. When these various components are assembled within the housing 502, the support ring 512 sits on the cradle 514, while the cooling filter 510 fits inside the support ring 512 (i.e., within an inner diameter of the support ring), and the sealing ring 508 rests on top of the support ring 512. The sealing ring 508 has an inner diameter that is smaller than the outer diameter of the cooling filter 510, which helps secure the filter 510 to the support ring 514. Likewise, the circular opening 506 has a diameter that is smaller than the outer diameter of the sealing ring 508, which helps secure the sealing ring 508, and hence the cooling filter 510, within the housing 502. The housing 502 may then be fastened or otherwise affixed to the arc management device (e.g., on the top cover thereof) over a ventilation port 518 therein via the mounting flange 504.

Any suitable filter or other porous substrate having a sufficiently high heat absorption capacity may be used for the cooling filter 510. The main requirement is the cooling filter 510 be able to cool arc byproducts from a typical arc blast temperature (e.g., 5000° F.) to a temperature where they are no longer conductive and can no longer reignite (e.g., 2,000° F.) in a very short period of time (e.g., a few milliseconds). Examples of suitable cooling filters 510 may include a mesh or screen type filter having a sufficiently low porosity to cool the arc byproducts to the requisite temperature (or lower) in the short amount of time. The cooling filter 510 may also be a honeycomb type filter having a sufficiently high surface-area-to-cross-section ratio to cool the arc byproducts to the requisite temperature or lower in the short amount of time. Other types of filters capable of the cooling needed may also be used without departing from the scope of the disclosed embodiments.

Figure 6A:
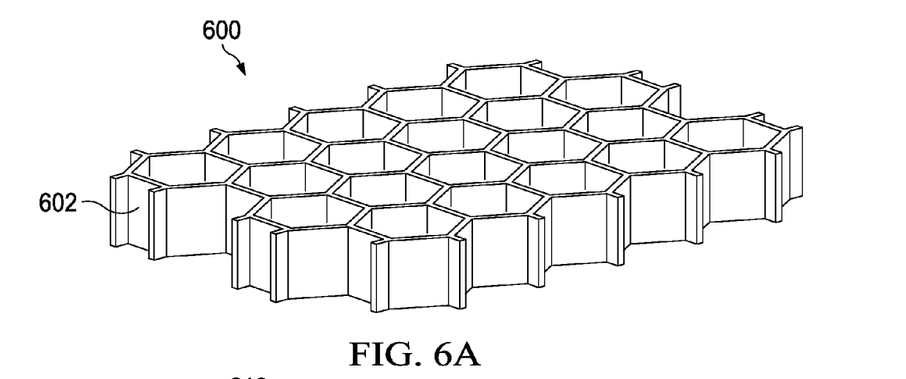
FIGS. 6A-6C show an exemplary filter for a cooling assembly according to one or more embodiments disclosed herein.
Figure 6B:
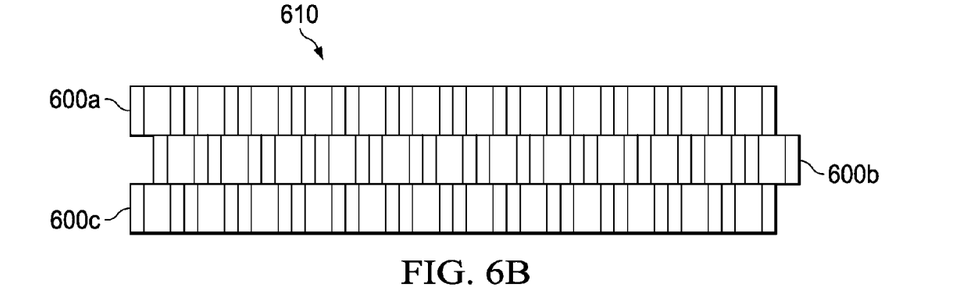
Figure 6C:
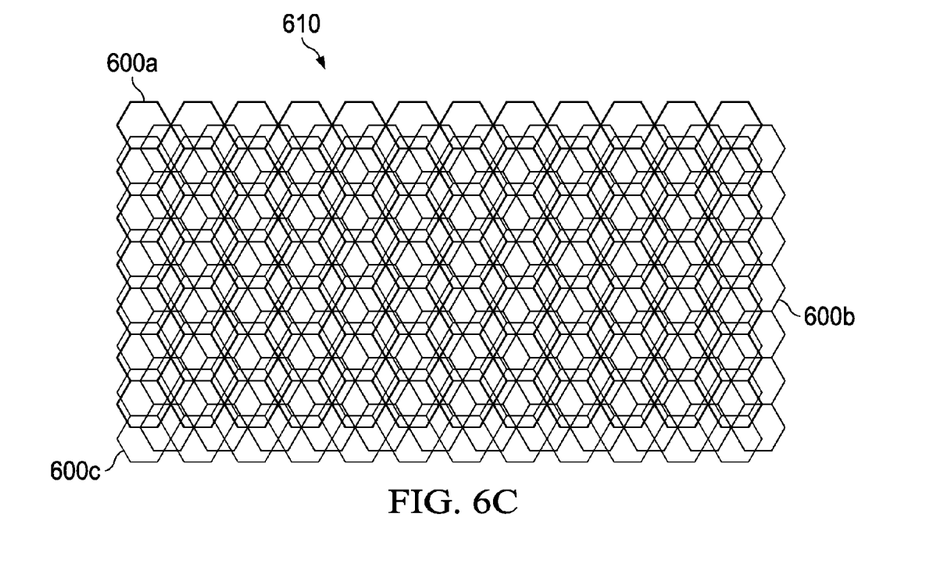

An example of a honeycomb type filter employed as the cooling filter is illustrated in FIGS. 6A-6C at 600. As can be seen in the perspective view of FIG. 6A, the honeycomb filter 600 resembles a series of hexagonal cells 602 connected together so there are no spaces or gaps between the cells 602. Such a honeycomb filter 600 is preferably a stainless steel honeycomb filter or an aramid fiber honeycomb filter, like honeycomb filters available from Plascore, Inc., but other suitable material may also be used without departing from the scope of the disclosed embodiments. While the term "honeycomb type" is used herein, it is not intended that this aspect of the disclosed embodiments be limited to a hexagonal walled structure. In any event, two or more of these honeycomb filters 600a, 600b, and 600c may then be stacked on top of one another in an overlapping or staggered manner, as depicted in the profile view of FIG. 6B, to form a cooling filter 610 that may be used in the filter-based cooling assemblies disclosed herein. The overlapping or staggered stacking of the honeycomb filters 600a-c multiplies the channelization through offset layers of the openings in the hexagonal cells 602, through which the arc byproducts must pass with each one of the honeycomb filter 600a-c, as depicted in the plan view of FIG. 6C. This has the effect of progressively increasing the rate energy is absorbed from the arc byproducts as they pass through each of the honeycomb filters 600a-c.

Mesh or screen type filters, on the other hand, do not necessarily have offset openings like the honeycomb filters 600a-c. These screens type filters may merely have progressively smaller openings. The screen type filters rely on extremely low porosity, which results in a large total surface area, to cool the arc byproducts to the requisite temperature or lower. The screen type filters may be a multi-screen filter composed of progressively finer layers of metal screens that are similar to filters used as circuit breaker particulate filters from Schneider Electric USA, Inc. Such circuit breaker (screen type) filters have been observed to absorb a significant amount of energy when used for cooling purposes.

An exemplary implementation of a filter-based cooling assembly 700 that uses the screen type filter described above is shown in FIGS. 7A-7B according to the embodiments disclosed herein. Other arrangements besides the exemplary one shown here may of course be used without departing from the scope of the disclosed embodiments. Because the screen type cooling filter has extremely low porosity, it may impede or prevent convective airflow during normal operating conditions if implemented in the same way as the honeycomb type filters. Therefore, the filter-based cooling assembly 700 is preferably implemented as a type of valve that allows convective airflow under normal operating conditions, but diverts all flow through the screen type cooling filter when an arc event occurs. An example of such a "diverter valve" is depicted in FIG. 7A.

Figure 7A:
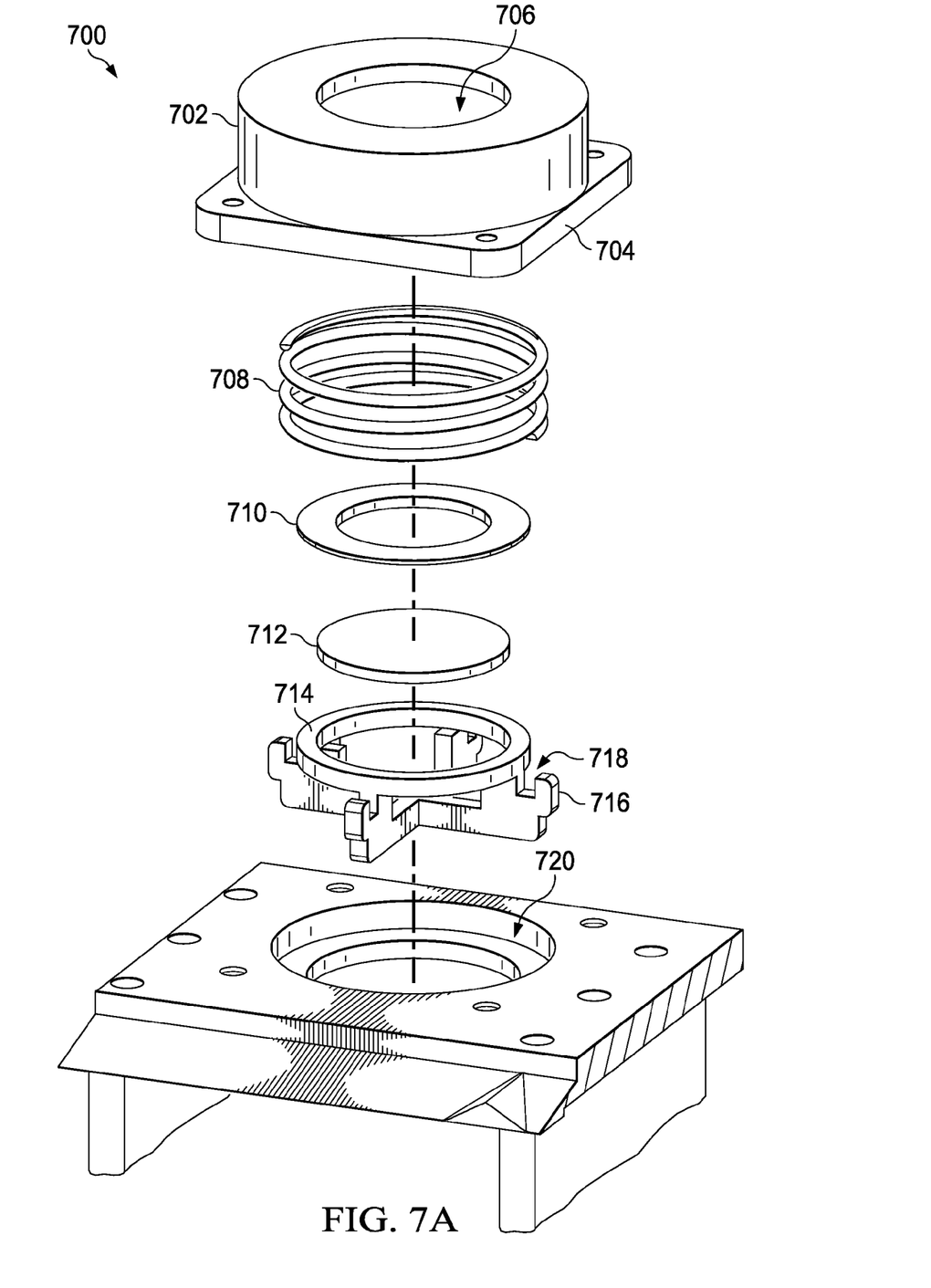
FIGS. 7A-7B show an alternative exemplary check valve cooling assembly according to one or more embodiments disclosed herein.

As can be seen in FIG. 7A, the filter-based cooling assembly 700 is similar to the filter-based cooling assembly 500 from FIG. 5 except it has been constructed as a diverter valve. There is a generally cylindrical housing 702 atop a generally rectangular mounting flange 704 and having a generally circular opening 706, as well as a sealing ring 710, a support ring 714, and a cradle 716. Unlike the filter-based cooling assembly 500, the filter-based cooling assembly 700 uses a progressive-screen type filter as a cooling filter 712. When the various components are assembled within the housing 702, the screen type cooling filter 712 fits inside the support ring 714 within an inner diameter thereof, and the sealing ring 710 rests on top of the support ring 714. The sealing ring 710 has an inner diameter that is larger than the outer diameter of the screen type cooling filter 712, which helps secure the cooling filter 712 to the support ring 714. Likewise, the opening 706 has a diameter that is smaller than the outer diameter of the sealing ring 710, which helps secure the sealing ring 710, and thus the cooling filter 712, to the support ring 714. The support ring 714 in turn sits on the cradle 716. A spring or other biasing mechanism 708 is provided in the housing 702 between the cradle 716 and opening 706 to bias or otherwise urge the cradle 716, and hence the cooling filter 712, away from the opening 706 to facilitate convective airflow around the sealing ring 710 and the cooling filter 712. The housing 702 may then be fastened or otherwise affixed to the arc management device (e.g., on the top cover thereof) over a ventilation port 720 therein, via the mounting flange 704.

Figure 7B:
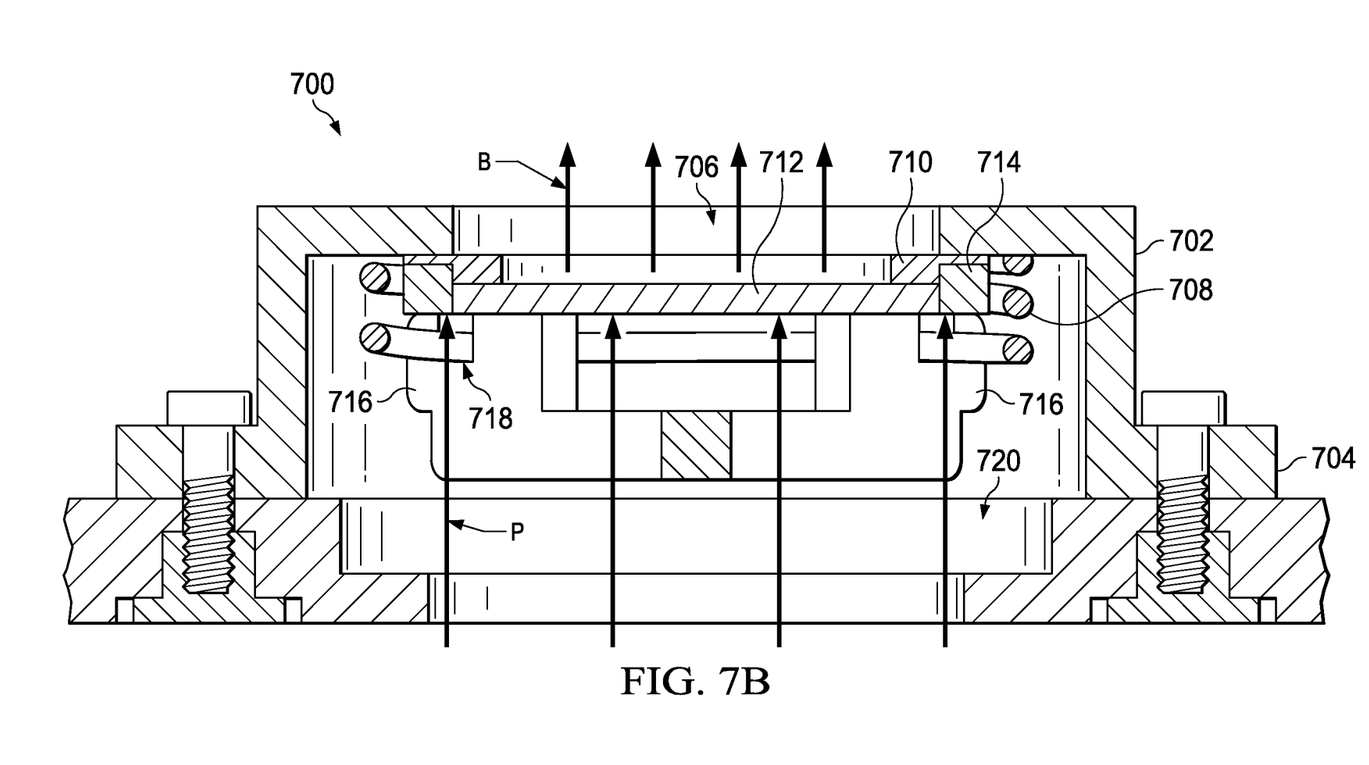

Operation of the above diverter valve is depicted in FIG. 7B. During normal operating conditions, convective air may circulate and flow around the sealing ring 710 and the cooling filter 712 and out the opening 706. When an arc occurs, the intense pressure created by the arc pushes the support ring 714, the cooling filter 712, and the sealing ring 710 against the housing 702, as indicated by the arrows labeled "P," thus blocking further convective airflow. All subsequent flow, including the flow of arc byproducts, is forced through the cooling filter 712, as indicated by the arrows labeled "B," resulting in cooling of the arc byproducts by the cooling filter 712.

It should be noted the use of a diverter valve is not needed for the honeycomb type cooling filter 510, discussed with respect to FIG. 5. The honeycomb type cooling filter 510 does not have the same low porosity as the screen type cooling filter 712 and therefore does not impede or restrict convective airflow to the same degree as the screen type cooling filter 712. For this reason, the honeycomb type cooling filter also does not require the use of check valves, discussed with respect to FIGS. 2 and 3. The honeycomb type cooling filter 510 may thus be incorporated into an arc management device without the need for any valves, which may significantly improve operational reliability (i.e., fewer moving parts) of the arc management device relative an arc management device incorporating the diverter valve of the screen type cooling filter 712.

Figure 8:
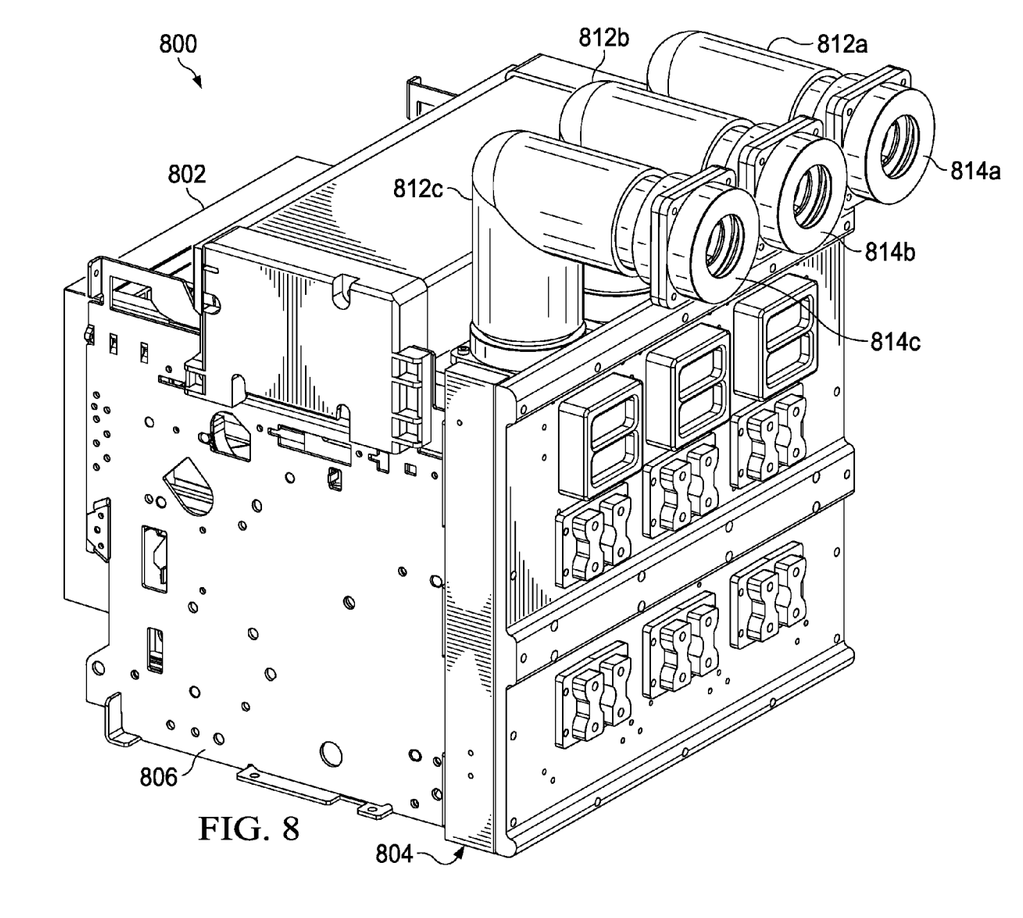
FIG. 8 is a circuit breaker and arc management device with alternative placement of the cooling assembly according to one or more embodiments disclosed herein.
Figure 9:
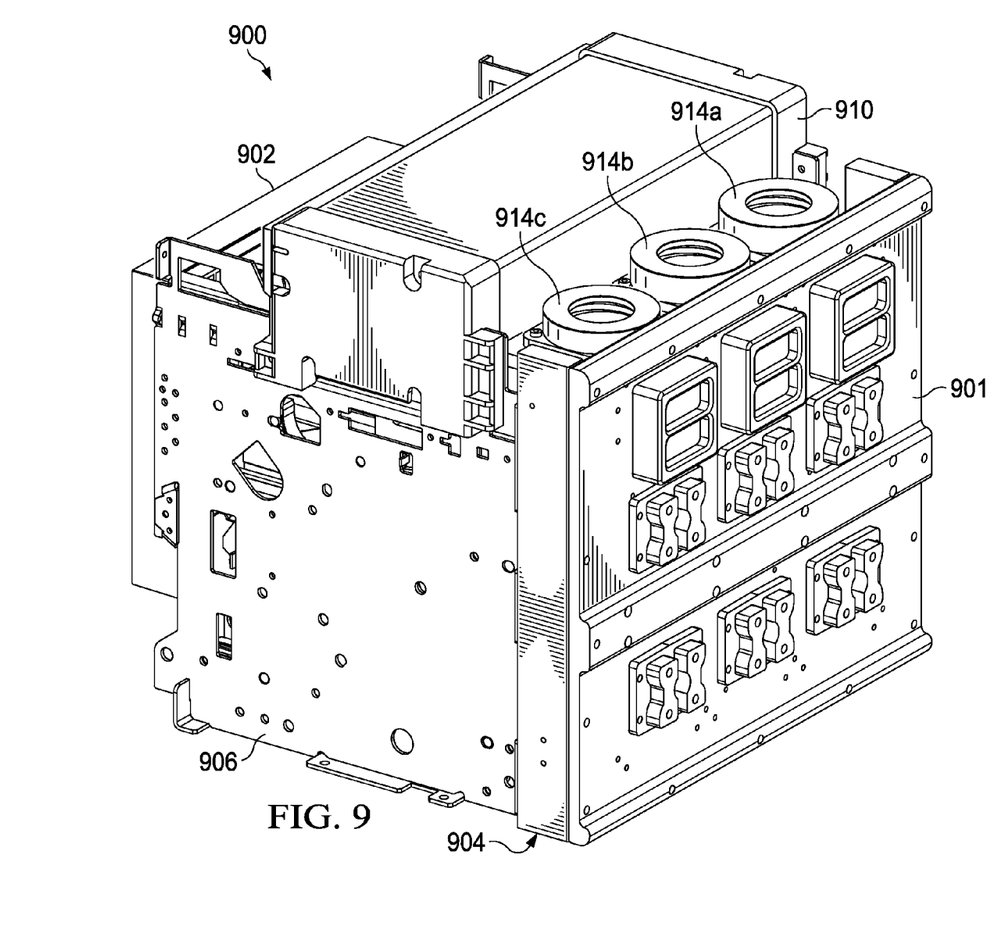
FIG. 9 is another circuit breaker and arc management device with alternative placement of the cooling assembly according to one or more embodiments disclosed herein.
Figure 10:
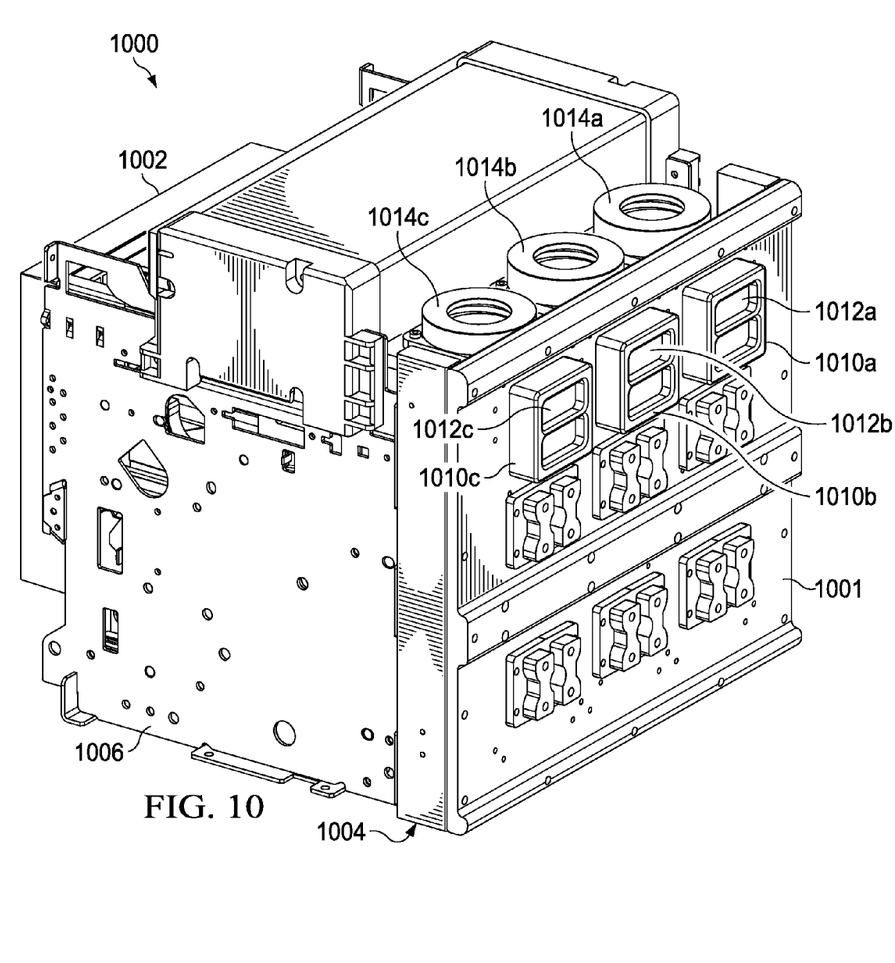
FIG. 10 is yet another circuit breaker and arc management device with alternative placement of the cooling assembly according to one or more embodiments.

Application of the screen type cooling filter is illustrated in FIGS. 8-10 where examples are shown of draw out circuit breakers equipped with arc management devices that employ the filter-based cooling assemblies disclosed herein.

Referring first to FIG. 8, a draw out circuit breaker 800 is shown having an enclosure 802 mounted to a draw out chassis 806. The enclosure 802 has a number of individual circuit breaker poles (not expressly shown) housed therein and an arc management device 804 attached thereto. The arc management device 804 has several rear-facing L-shaped ventilation tubes 812a, 812b, and 812c protruding from the top thereof, one ventilation tube for each pole of the circuit breaker and conductive bus phase. Each ventilation tube 812a-c has a filter-based cooling assembly 814a, 814b, and 814c mounted at the end thereof for cooling arc byproducts exiting the ventilation tubes. When these cooling assemblies 814a-c employ the screen type cooling filter discussed above, they are implemented as diverter valves in these embodiments.

FIG. 9 shows an example of the filter-based cooling assembly being mounted directly above a back-mold 901 of the arc management device 904 instead of at the end of ventilation tubes. Here, in place of ventilation tubes, filter-based cooling assemblies 914a, 914b, and 914c are mounted directly to the top of the arc management device 904 for each conductor phase. Again, when these cooling assemblies 914a-c employ a screen type cooling filter that may impede convective airflow, they are implemented as diverter valves that will otherwise allow convective airflow under normal operation.

FIG. 10 shows an example where the screen type cooling filter discussed herein is provided in rear ventilation ports within a back-mold 1001 of the arc management device 1004. In these embodiments, in addition to ambient ventilation ports under check valves 1014a-c in the top of the arc management device 1004, the arc management device 1004 also has rear ventilation ports 1010a, 1010b, and 1010c in the back-mold 1001 of the device. The rear ventilation ports 1010a-c are positioned in the back-mold 1001 such that there is one rear ventilation port for expelling or evacuating arc byproducts from each conductor phase. Screen type cooling filters 1012a, 1012b, and 1012c may then be mounted within each rear ventilation port 1010a-c for cooling the arc byproducts as they exit the rear ventilation ports. And because these screen type cooling filter 1012a-c may impede convective airflow, conventional check valves 1014a, 1014b, and 1014c have been provided to allow convective airflow through the arc management device 1004 during normal operation, and to force high pressure byproduct through the cooling filters 1012a-c when there is an arc blast.

Figure 11:
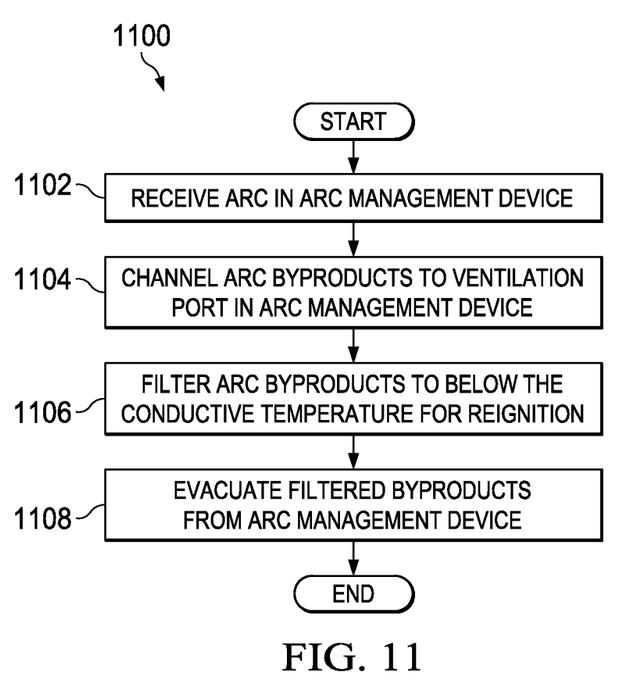
FIG. 11 is a flowchart of an exemplary method for cooling arc byproducts to below the conductive temperature for reignition according to one or more embodiments disclosed herein.

Based on the foregoing description, it can be seen that the arc byproduct cooling embodiments disclosed herein may be implemented in an arc management device in a number of ways. FIG. 11 offers general guidelines in the form of a flow chart 1100 that may be used with any implementation of the arc management device to cool arc byproducts according to the disclosed embodiments.

As the flow chart 1100 shows, cooling arc byproducts begins with receiving or capturing the arc byproducts in the arc management device at block 1102. At block 1104, the arc byproducts are channeled to the ventilation ports in the arc management device. These ventilation ports may be located on the top of the arc management device, on the bottom thereof, and/or in the back-mold thereof, and employ one or more cooling filters as described herein to cool the arc byproducts as they exit out the ventilation ports. At block 1106, the cooling filters disclosed herein absorb energy from the arc byproducts to cool them to below a temperature where they are no longer conductive and can no longer reignite. The thusly filtered arc byproducts are then released or otherwise evacuated from the arc management device into the cabinet interior (see FIG. 1) at block 1108.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. Arc resistant electrical distribution equipment, comprising:
    a passive arc management device installed on the electrical distribution equipment;
    a ventilation port formed in the arc management device and having a size and shape to expel arc byproducts resulting from arcs that occur in the electrical distribution equipment; and
    a filter housing located on the arc management device, the filter housing having a cooling filter housed therein, the cooling filter positioned to receive the arc byproducts expelled from the ventilation port;
    wherein the cooling filter includes a screen type filter that has multiple layers of progressively finer screens and a sufficiently high heat absorption capacity to cool the arc byproducts to a temperature where the arc byproducts can no longer reignite.

2. The arc resistant electrical distribution equipment of claim 1, wherein the filter housing is a diverter valve configured to remain open to convective airflow during normal operation and to shut off convective airflow when there is a sudden pressure increase in the arc management device.

3. The arc resistant electrical distribution equipment of claim 1, wherein the arc management device includes a ventilation conduit and the filter housing is mounted on the ventilation conduit of the arc management device.

4. The arc resistant electrical distribution equipment of claim 1, wherein the arc management device includes a back-mold for a conductor bus assembly and the filter housing is mounted in the back-mold of the arc management device.

5. A method of limiting damage from arc blasts in electrical distribution equipment, comprising:
   receiving an arc in a chamber of an arc management device;
   channeling arc byproducts resulting from the arc to a ventilation port in the arc management device;
   filtering the arc byproducts to a temperature where the arc byproducts can no longer reignite; and
   releasing the filtered arc byproducts from the arc management device into a cabinet of the electrical distribution equipment.

6. The method of claim 5, wherein filtering is performed using a honeycomb type filter.

7. The method of claim 5, wherein filtering is performed using multiple honeycomb type filters layered on top of one another in a staggered manner.

8. The method of claim 5, wherein filtering is performed using a screen type filter having multiple layers of progressively finer screens.

9. The method of claim 5, wherein filtering takes place as the arc byproducts exit out a ventilation conduit connected to the arc management device.

10. The method of claim 5, wherein filtering takes place as the arc byproducts exit out a back-mold of the arc management device.

11. The method of claim 5, further comprising closing off convective airflow in the arc management device when there is a sudden pressure increase in the arc management device.

12. Arc resistant electrical distribution equipment, comprising:
   a passive arc management device installed on the electrical distribution equipment;
   a ventilation port formed in the arc management device and having a size and shape to expel arc byproducts resulting from arcs that occur in the electrical distribution equipment; and
   a filter housing located on the arc management device, the filter housing having a cooling filter housed therein, the cooling filter positioned to receive the arc byproducts expelled from the ventilation port;
   wherein the cooling filter includes a honeycomb type filter that has a sufficiently high heat absorption capacity to cool the arc byproducts to a temperature where the arc byproducts can no longer reignite.

13. The arc resistant electrical distribution equipment of claim 1, wherein the cooling filter includes multiple honeycomb type filters layered on top of one another in a staggered manner.

14. The arc resistant electrical distribution equipment of claim 1, wherein the cooling filter is composed primarily of one of the following materials: stainless steel or aramid fiber.

15. The arc resistant electrical distribution equipment of claim 1, wherein the arc management device includes a ventilation conduit and the filter housing is mounted on the ventilation conduit of the arc management device.

* * * * *